US008782231B2

(12) United States Patent
Jackson

(10) Patent No.: US 8,782,231 B2
(45) Date of Patent: *Jul. 15, 2014

(54) SIMPLE INTEGRATION OF ON-DEMAND COMPUTE ENVIRONMENT

(75) Inventor: David B. Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 993 days.

This patent is subject to a terminal disclaimer.

(21) Appl. No.: 11/276,854

(22) Filed: Mar. 16, 2006

(65) Prior Publication Data

US 2006/0212332 A1    Sep. 21, 2006

Related U.S. Application Data

(60) Provisional application No. 60/662,240, filed on Mar. 16, 2005.

(51) Int. Cl.
*G06F 15/173* (2006.01)
*G06F 15/16* (2006.01)
*G06F 9/46* (2006.01)

(52) U.S. Cl.
USPC ............ 709/226; 709/224; 709/201; 718/105

(58) Field of Classification Search
USPC ........... 709/226, 224, 203; 455/3.01; 715/273
See application file for complete search history.

(56) References Cited

U.S. PATENT DOCUMENTS

| 4,532,893 | A |   | 8/1985  | Day et al. |
|-----------|---|---|---------|------------|
| 4,553,202 | A | * | 11/1985 | Trufyn ............................ 710/269 |
| 4,677,614 | A |   | 6/1987  | Circo |
| 4,943,932 | A |   | 7/1990  | Lark et al. |
| 5,146,561 | A | * | 9/1992  | Carey et al. ................... 709/200 |
| 5,299,115 | A |   | 3/1994  | Fields et al. |
| 5,349,682 | A |   | 9/1994  | Rosenberry |
| 5,377,332 | A |   | 12/1994 | Entwistle et al. |
| 5,542,000 | A | * | 7/1996  | Semba ............................ 381/61 |
| 5,598,536 | A | * | 1/1997  | Slaughter et al. ............. 709/219 |
| 5,600,844 | A | * | 2/1997  | Shaw et al. .................... 715/273 |
| 5,651,006 | A | * | 7/1997  | Fujino et al. .................. 370/408 |
| 5,675,739 | A | * | 10/1997 | Eilert et al. ................... 709/226 |
| 5,761,433 | A | * | 6/1998  | Billings ........................ 709/231 |
| 5,826,239 | A |   | 10/1998 | Du et al. |
| 5,874,789 | A | * | 2/1999  | Su ................................. 307/141 |

(Continued)

FOREIGN PATENT DOCUMENTS

WO    WO 01/14987    3/2001
WO    WO 2005/017783    2/2005

OTHER PUBLICATIONS

U.S. Appl. No. 60/662,240, filed Nov. 1985, Trufyn.
U.S. Appl. No. 11/279,007, filed Jul. 2000, Smith et al.

(Continued)

*Primary Examiner* — Azizul Choudhury
*Assistant Examiner* — Margishi Desai

(57) ABSTRACT

Disclosed are a system and method of integrating an on-demand compute environment into a local compute environment. The method includes receiving a request from an administrator to integrate an on-demand compute environment into a local compute environment and, in response to the request, automatically integrating local compute environment information with on-demand compute environment information to make available resources from the on-demand compute environment to requestors of resources in the local compute environment.

15 Claims, 5 Drawing Sheets

(56) References Cited

U.S. PATENT DOCUMENTS

| | | | |
|---|---|---|---|
| 5,961,599 A * | 10/1999 | Kalavade et al. | 709/224 |
| 5,987,611 A | 11/1999 | Freund | |
| 6,006,192 A | 12/1999 | Cheng et al. | |
| 6,108,662 A | 8/2000 | Hoskins et al. | |
| 6,151,598 A * | 11/2000 | Shaw et al. | 1/1 |
| 6,185,601 B1 | 2/2001 | Wolff | |
| 6,195,678 B1 * | 2/2001 | Komuro | 709/202 |
| 6,201,611 B1 * | 3/2001 | Carter et al. | 358/1.15 |
| 6,202,080 B1 | 3/2001 | Lu et al. | |
| 6,314,114 B1 | 11/2001 | Coyle et al. | |
| 6,338,112 B1 | 1/2002 | Wipfel et al. | |
| 6,345,287 B1 | 2/2002 | Fong et al. | |
| 6,363,488 B1 * | 3/2002 | Ginter et al. | 726/1 |
| 6,366,945 B1 | 4/2002 | Fong et al. | |
| 6,393,569 B1 | 5/2002 | Orenshteyn | |
| 6,418,459 B1 | 7/2002 | Gulick | |
| 6,434,568 B1 * | 8/2002 | Bowman-Amuah | 1/1 |
| 6,438,594 B1 * | 8/2002 | Bowman-Amuah | 709/225 |
| 6,463,454 B1 | 10/2002 | Lumelsky et al. | |
| 6,466,980 B1 * | 10/2002 | Lumelsky et al. | 709/226 |
| 6,477,580 B1 * | 11/2002 | Bowman-Amuah | 709/231 |
| 6,487,390 B1 * | 11/2002 | Virine et al. | 455/3.01 |
| 6,571,215 B1 | 5/2003 | Mahapatro | |
| 6,571,391 B1 * | 5/2003 | Acharya et al. | 725/87 |
| 6,578,068 B1 * | 6/2003 | Bowman-Amuah | 709/203 |
| 6,601,234 B1 * | 7/2003 | Bowman-Amuah | 717/108 |
| 6,606,660 B1 * | 8/2003 | Bowman-Amuah | 709/227 |
| 6,633,544 B1 | 10/2003 | Rexford et al. | |
| 6,640,238 B1 | 10/2003 | Bowman-Amuah | |
| 6,738,736 B1 * | 5/2004 | Bond | 703/2 |
| 6,816,905 B1 | 11/2004 | Sheets et al. | |
| 6,857,020 B1 * | 2/2005 | Chaar et al. | 709/226 |
| 6,868,097 B1 | 3/2005 | Soda et al. | |
| 6,971,098 B2 | 11/2005 | Khare et al. | |
| 6,978,310 B1 * | 12/2005 | Rodriguez et al. | 709/231 |
| 7,080,378 B1 | 7/2006 | Noland et al. | |
| 7,082,606 B2 | 7/2006 | Wood et al. | |
| 7,103,625 B1 | 9/2006 | Hipp et al. | |
| 7,177,823 B2 | 2/2007 | Lam et al. | |
| 7,206,819 B2 * | 4/2007 | Schmidt | 709/214 |
| 7,242,501 B2 * | 7/2007 | Ishimoto | 358/2.1 |
| 7,293,092 B2 | 11/2007 | Sukegawa | |
| 7,328,406 B2 | 2/2008 | Kalinoski et al. | |
| 7,334,230 B2 | 2/2008 | Chung et al. | |
| 7,356,655 B2 | 4/2008 | Allen et al. | |
| 7,356,770 B1 * | 4/2008 | Jackson | 715/736 |
| 7,380,039 B2 * | 5/2008 | Miloushev et al. | 710/244 |
| 7,386,586 B1 | 6/2008 | Headley et al. | |
| 7,401,355 B2 * | 7/2008 | Supnik et al. | 726/11 |
| 7,437,460 B2 | 10/2008 | Chidambaran et al. | |
| 7,437,730 B2 * | 10/2008 | Goyal | 718/105 |
| 7,464,159 B2 | 12/2008 | Di Luoffo et al. | |
| 7,502,884 B1 | 3/2009 | Shah et al. | |
| 7,516,221 B2 | 4/2009 | Souder et al. | |
| 7,546,553 B2 | 6/2009 | Bozak et al. | |
| 7,577,959 B2 | 8/2009 | Nguyen et al. | |
| 7,627,691 B1 | 12/2009 | Buchsbaum et al. | |
| 7,640,547 B2 | 12/2009 | Neiman et al. | |
| 7,698,430 B2 | 4/2010 | Jackson | |
| 7,761,557 B2 | 7/2010 | Fellenstein et al. | |
| 7,930,397 B2 | 4/2011 | Midgley | |
| 8,260,893 B1 | 9/2012 | Bandhole et al. | |
| 8,261,349 B2 * | 9/2012 | Peng | 726/22 |
| 2001/0051929 A1 | 12/2001 | Suzuki | |
| 2002/0002636 A1 | 1/2002 | Vange et al. | |
| 2002/0010783 A1 | 1/2002 | Primak et al. | |
| 2002/0049608 A1 | 4/2002 | Hartsell et al. | |
| 2002/0059274 A1 | 5/2002 | Hartsell et al. | |
| 2002/0062377 A1 | 5/2002 | Hillman et al. | |
| 2002/0120741 A1 * | 8/2002 | Webb et al. | 709/225 |
| 2002/0152305 A1 * | 10/2002 | Jackson et al. | 709/224 |
| 2002/0156891 A1 | 10/2002 | Ulrich et al. | |
| 2002/0174227 A1 * | 11/2002 | Hartsell et al. | 709/226 |
| 2003/0050989 A1 | 3/2003 | Marinescu et al. | |
| 2003/0105721 A1 * | 6/2003 | Ginter et al. | 705/54 |
| 2003/0177121 A1 * | 9/2003 | Moona et al. | 707/9 |
| 2003/0191857 A1 | 10/2003 | Terrell et al. | |
| 2003/0195931 A1 * | 10/2003 | Dauger | 709/205 |
| 2003/0212738 A1 * | 11/2003 | Wookey et al. | 709/203 |
| 2004/0003077 A1 * | 1/2004 | Bantz et al. | 709/224 |
| 2004/0010550 A1 | 1/2004 | Gopinath | |
| 2004/0054630 A1 * | 3/2004 | Ginter et al. | 705/53 |
| 2004/0103078 A1 | 5/2004 | Smedberg et al. | |
| 2004/0103305 A1 * | 5/2004 | Ginter et al. | 713/200 |
| 2004/0143664 A1 | 7/2004 | Usa et al. | |
| 2004/0194098 A1 | 9/2004 | Chung et al. | |
| 2004/0213395 A1 * | 10/2004 | Ishii et al. | 379/201.01 |
| 2004/0221038 A1 * | 11/2004 | Clarke et al. | 709/226 |
| 2004/0236852 A1 * | 11/2004 | Birkestrand et al. | 709/226 |
| 2004/0260746 A1 | 12/2004 | Brown et al. | |
| 2004/0267897 A1 * | 12/2004 | Hill et al. | 709/217 |
| 2005/0021759 A1 | 1/2005 | Gupta et al. | |
| 2005/0022188 A1 * | 1/2005 | Tameshige et al. | 718/100 |
| 2005/0027863 A1 | 2/2005 | Talwar et al. | |
| 2005/0027865 A1 | 2/2005 | Bozak et al. | |
| 2005/0038835 A1 | 2/2005 | Chidambaran et al. | |
| 2005/0044228 A1 | 2/2005 | Birkestrand et al. | |
| 2005/0049884 A1 | 3/2005 | Hunt et al. | |
| 2005/0050057 A1 | 3/2005 | Mital et al. | |
| 2005/0054354 A1 | 3/2005 | Roman et al. | |
| 2005/0055322 A1 | 3/2005 | Masters et al. | |
| 2005/0055694 A1 | 3/2005 | Lee | |
| 2005/0055698 A1 | 3/2005 | Sasaki et al. | |
| 2005/0060608 A1 * | 3/2005 | Marchand | 714/18 |
| 2005/0080845 A1 | 4/2005 | Gopinath | |
| 2005/0102396 A1 | 5/2005 | Hipp | |
| 2005/0114862 A1 * | 5/2005 | Bisdikian et al. | 718/105 |
| 2005/0120160 A1 | 6/2005 | Plouffe et al. | |
| 2005/0125537 A1 * | 6/2005 | Martins et al. | 709/226 |
| 2005/0165925 A1 * | 7/2005 | Dan et al. | 709/224 |
| 2005/0188088 A1 | 8/2005 | Fellenstein et al. | |
| 2005/0190236 A1 * | 9/2005 | Ishimoto | 347/55 |
| 2005/0192771 A1 * | 9/2005 | Fischer et al. | 702/122 |
| 2005/0198200 A1 | 9/2005 | Subramanian et al. | |
| 2005/0210470 A1 | 9/2005 | Chung et al. | |
| 2005/0243867 A1 * | 11/2005 | Petite | 370/474 |
| 2005/0267948 A1 * | 12/2005 | McKinley et al. | 709/217 |
| 2005/0268063 A1 * | 12/2005 | Diao et al. | 711/170 |
| 2005/0278760 A1 | 12/2005 | Dewar et al. | |
| 2005/0289540 A1 * | 12/2005 | Nguyen et al. | 718/1 |
| 2006/0008256 A1 * | 1/2006 | Khedouri et al. | 386/124 |
| 2006/0015773 A1 | 1/2006 | Singh et al. | |
| 2006/0031379 A1 | 2/2006 | Kasriel et al. | |
| 2006/0041444 A1 * | 2/2006 | Flores et al. | 705/1 |
| 2006/0048157 A1 | 3/2006 | Dawson et al. | |
| 2006/0069926 A1 * | 3/2006 | Ginter et al. | 713/194 |
| 2006/0095917 A1 | 5/2006 | Black-Ziegelbein et al. | 718/104 |
| 2006/0112184 A1 * | 5/2006 | Kuo | 709/236 |
| 2006/0117317 A1 | 6/2006 | Crawford et al. | |
| 2006/0143350 A1 * | 6/2006 | Miloushev et al. | 710/242 |
| 2006/0149695 A1 * | 7/2006 | Bossman et al. | 706/48 |
| 2006/0155740 A1 * | 7/2006 | Chen et al. | 707/102 |
| 2006/0168107 A1 * | 7/2006 | Balan et al. | 709/218 |
| 2006/0168224 A1 | 7/2006 | Midgley | |
| 2006/0189349 A1 * | 8/2006 | Montulli et al. | 455/556.1 |
| 2006/0190775 A1 | 8/2006 | Aggarwal et al. | |
| 2006/0212332 A1 | 9/2006 | Jackson | |
| 2006/0212333 A1 | 9/2006 | Jackson | |
| 2006/0212740 A1 | 9/2006 | Jackson | |
| 2006/0224741 A1 | 10/2006 | Jackson | |
| 2006/0251419 A1 | 11/2006 | Zadikian et al. | |
| 2006/0294238 A1 | 12/2006 | Naik et al. | |
| 2007/0067366 A1 * | 3/2007 | Landis | 707/205 |
| 2007/0083899 A1 | 4/2007 | Compton et al. | |
| 2007/0088822 A1 | 4/2007 | Coile et al. | |
| 2007/0094691 A1 | 4/2007 | Gazdzinski | |
| 2007/0124344 A1 | 5/2007 | Rajakannimariyan et al. | |
| 2007/0143824 A1 * | 6/2007 | Shahbazi | 726/1 |
| 2007/0180380 A1 * | 8/2007 | Khavari et al. | 715/704 |
| 2007/0266136 A1 | 11/2007 | Esfahany et al. | |
| 2008/0215730 A1 | 9/2008 | Sundaram et al. | |
| 2009/0070771 A1 | 3/2009 | Yuyitung et al. | |
| 2009/0100133 A1 | 4/2009 | Giulio et al. | |
| 2009/0105059 A1 | 4/2009 | Dorry et al. | |

(56) References Cited

U.S. PATENT DOCUMENTS

| | | | |
|---|---|---|---|
| 2009/0113056 A1 | 4/2009 | Tameshige et al. | |
| 2009/0138594 A1* | 5/2009 | Fellenstein et al. | 709/224 |
| 2009/0210495 A1* | 8/2009 | Wolfson et al. | 709/205 |
| 2009/0216910 A1* | 8/2009 | Duchesneau | 709/250 |
| 2009/0225360 A1* | 9/2009 | Shirai | 358/1.15 |
| 2009/0234974 A1* | 9/2009 | Arndt et al. | 709/250 |
| 2009/0238349 A1* | 9/2009 | Pezzutti | 379/93.02 |
| 2010/0318665 A1 | 12/2010 | Demmer et al. | |
| 2012/0159116 A1* | 6/2012 | Lim et al. | 711/206 |
| 2012/0185334 A1* | 7/2012 | Sarkar et al. | 705/14.58 |
| 2012/0218901 A1 | 8/2012 | Jungck et al. | |

OTHER PUBLICATIONS

Gupta et al., "Provisioning a virtual private network: a network design problem for multicommodity flow", Proceedings of the thirty-third annual ACM symposium on Theory of computing [online], Jul. 2001, pp. 389-398, abstract [retrieved on Jun. 14, 2007]. Retrieved from the Internet: URL:http://portal.acm.org/citation.crm?id=380830&dl=ACM&coll=GUIDE.

* cited by examiner

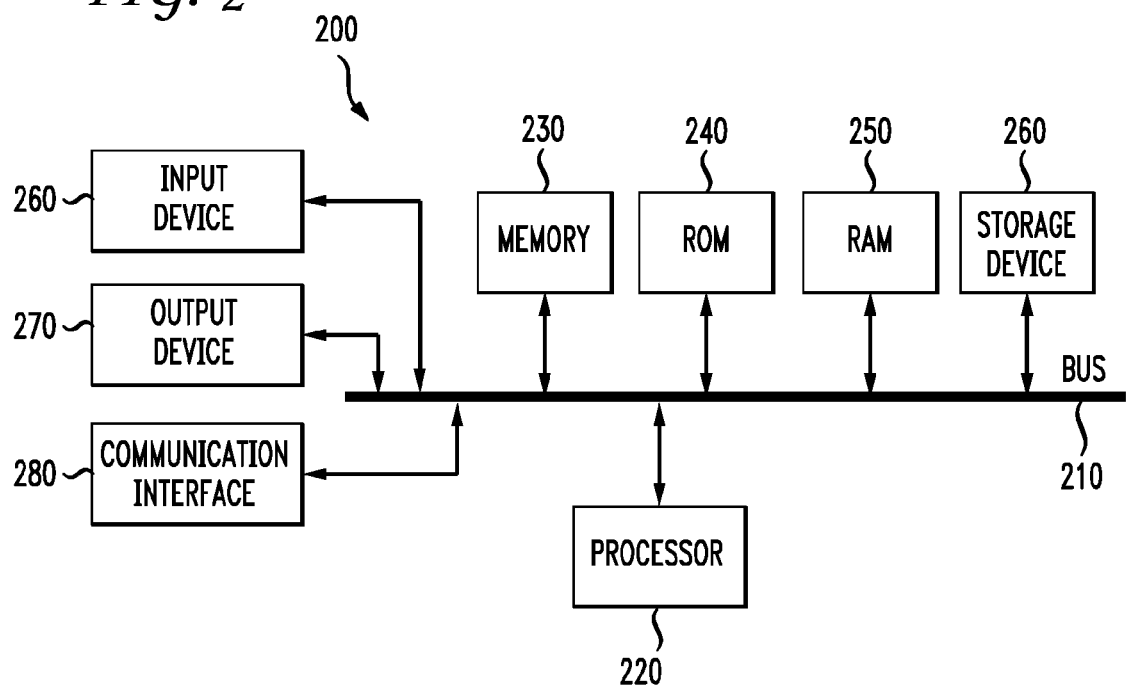
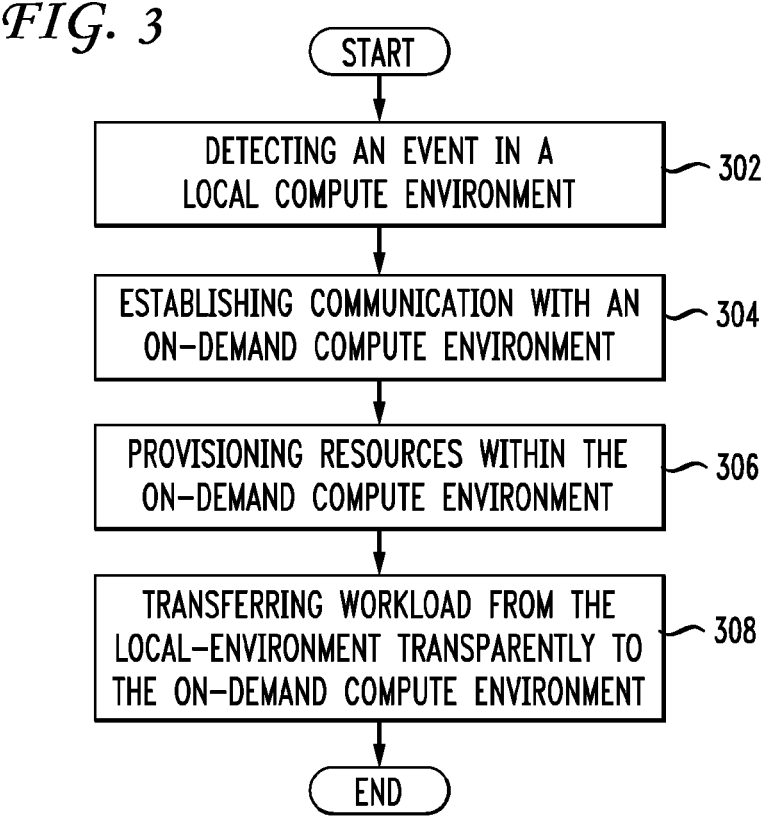

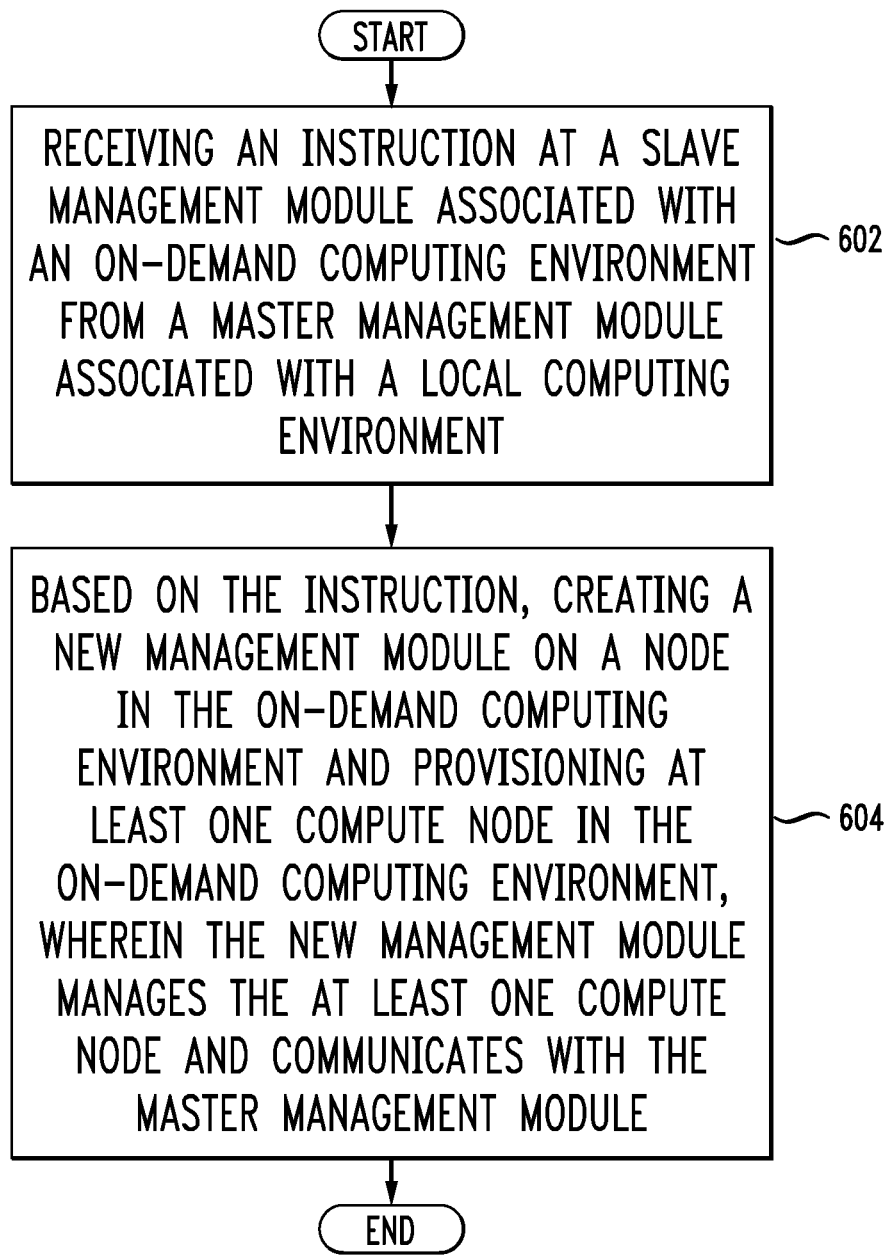

SIMPLE INTEGRATION OF ON-DEMAND COMPUTE ENVIRONMENT

PRIORITY CLAIM

The present application claims priority to U.S. Provisional Application No. 60/662,240 filed Mar. 16, 2005, the contents of which are incorporated herein by reference.

RELATED APPLICATION

The present application is related to U.S. application Ser. No. 11/276,852 incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Disclosure

The present disclosure relates to a resource management system and more specifically to a system and method of providing access to on-demand compute resources.

2. Introduction

Managers of clusters desire maximum return on investment often meaning high system utilization and the ability to deliver various qualities of service to various users and groups. A cluster is typically defined as a parallel computer that is constructed of commodity components and runs as its system software commodity software. A cluster contains nodes each containing one or more processors, memory that is shared by all of the processors in the respective node and additional peripheral devices such as storage disks that are connected by a network that allows data to move between nodes. A cluster is one example of a compute environment. Other examples include a grid, which is loosely defined as a group of clusters, and a computer farm which is another organization of computer for processing.

Often a set of resources organized in a cluster or a grid may have jobs to be submitted to the resources that require more capability than the set of resource has available. In this regard, there is a need in the art for being able to easily, efficiently and on-demand be able to utilize new resources or different resources to handle a job. The concept of "on-demand" compute resources has been developing in the high performance computing community recently. An on-demand computing environment enables companies to procure compute power for average demand and then contract remote processing power to help in peak loads or to offload all their compute needs to a remote facility. Several reference books having background material related to on-demand computing or utility computing include Mike Ault, Madhu Tumma, *Oracle 10 g Grid & Real Application Clusters,* Rampant TechPress, 2004 and Guy Bunker, Darren Thomson, *Delivering Utility Computing Business-driven IT Optimization,* John Wiley & Sons Ltd, 2006.

In Bunker and Thompson, section 3.3 on page 32 is entitled "Connectivity: The Great Enabler" wherein they discuss how the interconnecting of computers will dramatically increase their usefulness. This disclosure addresses that issue. There exists in the art a need for improved solutions to enable communication and connectivity with an on-demand high performance computing center.

SUMMARY

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure include, but are not limited to, methods, systems, computing devices, clusters, grids and computer-readable media that perform the processes and steps described herein.

The method embodiment provides for a method of integrating an on-demand compute environment into a local compute environment. The method includes receiving a request from an administrator to integrate an on-demand compute environment into a local compute environment and, in response to the request, automatically integrating local compute environment information with on-demand compute environment information to make available resources from the on-demand compute environment to requestors of resources in the local compute environment.

A benefit of the approaches disclosed herein is a reduction in unnecessary costs of building infrastructure to accommodate peak demand. Thus, customers only pay for the extra processing power they need only during those times when they need it.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended documents and drawings. Understanding that these drawings depict only typical embodiments of the disclosure and are not therefore to be considered to be limiting of its scope, the disclosure will be described and explained with additional specificity and detail through the use of the accompanying drawings.

FIG. 2 illustrates basic hardware components;

FIG. 3 illustrates a method aspect of the disclosure;

FIG. 6 illustrates another method aspect of the disclosure.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the disclosure.

Figure 1:
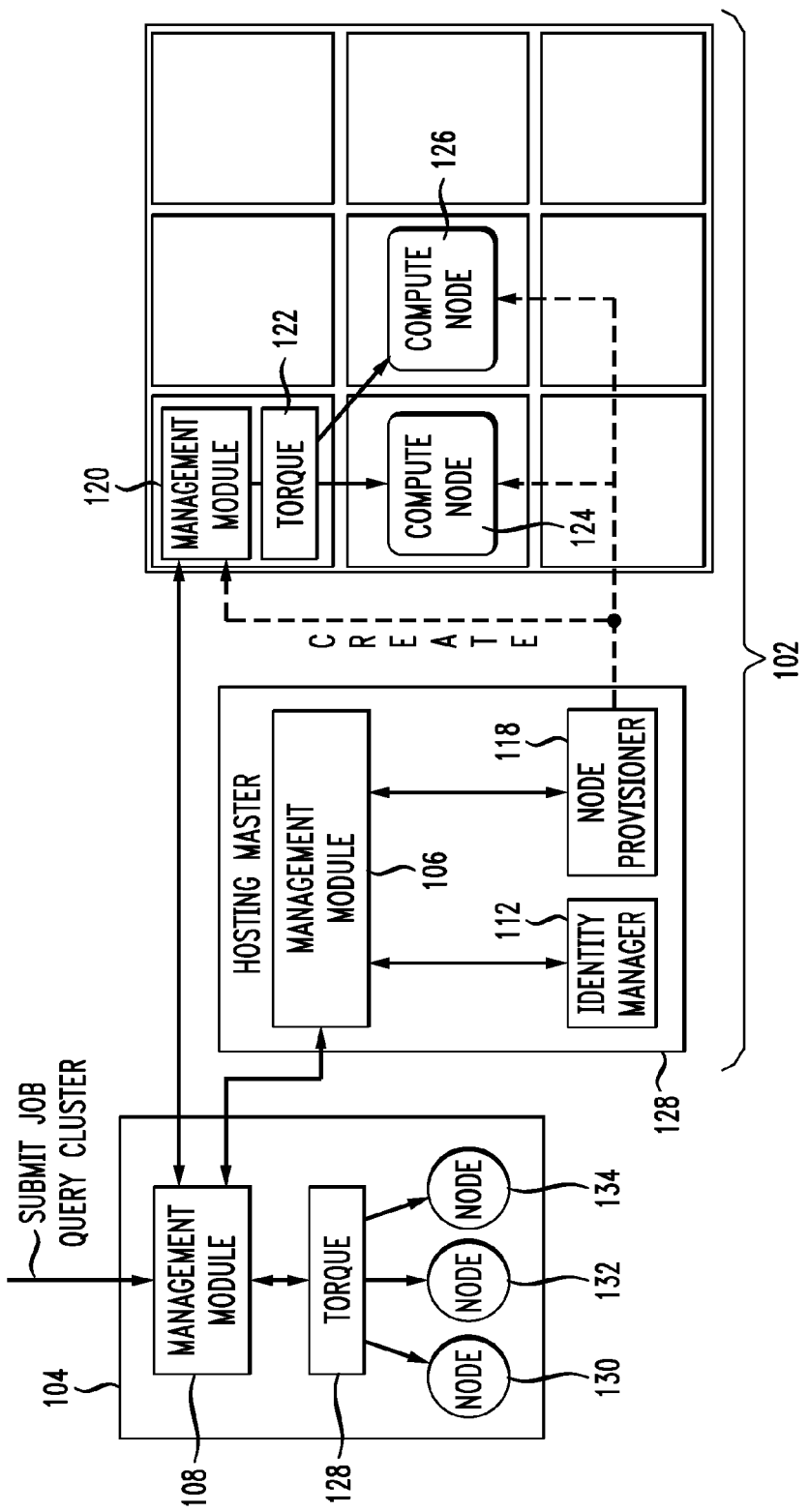
FIG. 1 illustrates the basic arrangement of the present disclosure.

This disclosure relates to the access and management of on-demand or utility computing resources at a hosting center. FIG. 1 illustrates the basic arrangement and interaction between a local compute environment 104 and an on-demand hosting center 102. The local compute environment may include a cluster, a grid, or any other variation on these types of multiple node and commonly managed environments. The on-demand hosting center or on-demand computing environment 102 includes a group of nodes that are available for provisioning and preferably has a dedicated node containing a hosting master 128 which may include a slave management module 106 and/or at least one other module such as the entity manager 128 and node provisioner 118.

Products such as Moab provide an essential service for optimization of a local compute environment. It provides an analysis into how & when local resources, such as software and hardware devices, are being used for the purposes of charge-back, planning, auditing, troubleshooting and reporting internally or externally. Such optimization enables the local environment to be tuned to get the most out of the resources in the local compute environment. However, there are times where more resources are needed.

Typically a hosting center 102 will have the following attributes. It allows an organization to provide resources or services to customers where the resources or services are custom-tailored to the needs of the customer. Supporting true utility computing usually requires creating a hosting center 102 with one or more capabilities as follows: secure remote access, guaranteed resource availability at a fixed time or series of times, integrated auditing/accounting/billing services, tiered service level (QoS/SLA) based resource access, dynamic compute node provisioning, full environment management over compute, network, storage, and application/service based resources, intelligent workload optimization, high availability, failure recovery, and automated re-allocation.

A management module 108 such as, by way of example, Moab™ (which may also refer to any Moab product such as the Moab Workload Manager®, Moab Grid Monitor®, etc. from Cluster Resources, Inc.) enables utility computing by allowing compute resources to be reserved, allocated, and dynamically provisioned to meet the needs of internal or external workload. Thus, at peak workload times, the local compute environment does not need to be built out with peak usage in mind. As periodic peak resources are required, triggers can cause overflow to the on-demand environment and thus save money for the customer. The module 108 is able to respond to either manual or automatically generated requests and can guarantee resource availability subject to existing service level agreement (SLA) or quality of service (QOS) based arrangements. As an example, FIG. 1 shows a user submitting a job or a query 110 to the cluster or local environment 104. The local environment will typically be a cluster or a grid with local workload. Jobs may be submitted which have explicit resource requirements. The local environment 104 will have various attributes such as operating systems, architecture, network types, applications, software, bandwidth capabilities, etc, which are expected by the job implicitly. In other words, jobs will typically expect that the local environment will have certain attributes that will enable it to consume resources in an expected way.

Other software is shown by way of example in a distributed resource manager such as Torque 128 and various nodes 130, 132 and 134. The management modules (both master and/or slave) may interact and operate with any resource manager, such as Torque, LSF, SGE, PBS and LoadLeveler and are agnostic in this regard. Those of skill in the art will recognize these different distributed resource manager software packages.

A hosting master or hosting management module 106 may also be an instance of a Moab software product with hosting center capabilities to enable an organization to dynamically control network, compute, application, and storage resources and to dynamically provision operating systems, security, credentials, and other aspects of a complete end-to-end compute environments. Module 106 is responsible for knowing all the policies, guarantees, promises and also for managing the provisioning of resources within the utility computing space 102. In one sense, module 106 may be referred to as the "master" module in that it couples and needs to know all of the information associated with both the utility environment and the local environment. However, in another sense it may be referred to as the slave module or provisioning broker wherein it takes instructions from the customer management module 108 for provisioning resources and builds whatever environment is requested in the on-demand center 102. A slave module would have none of its own local policies but rather follows all requests from another management module. For example, when module 106 is the slave module, then a master module 108 would submit automated or manual (via an administrator) requests that the slave module 106 simply follows to manage the build out of the requested environment. Thus, for both IT and end users, a single easily usable interface can increase efficiency, reduce costs including management costs and improve investments in the local customer environment. The interface to the local environment which also has the access to the on-demand environment may be a web-interface or access portal as well. Restrictions of feasibility only may exist. The customer module 108 would have rights and ownership of all resources. The allocated resources would not be shared but be dedicated to the requestor. As the slave module 106 follows all directions from the master module 108, any policy restrictions will preferably occur on the master module 108 in the local environment.

The modules also provide data management services that simplify adding resources from across a local environment. For example, if the local environment includes a wide area network, the management module 108 provides a security model that ensures, when the environment dictates, that administrators can rely on the system even when untrusted resources at the certain level have been added to the local environment or the on-demand environment. In addition, the management modules comply with n-tier web services based architectures and therefore scalability and reporting are inherent parts of the system. A system operating according to the principles set forth herein also has the ability to track, record and archive information about jobs or other processes that have been run on the system.

A hosting center 102 provides scheduled dedicated resources to customers for various purposes and typically has a number of key attributes: secure remote access, guaranteed resource availability at a fixed time or series of times, tightly integrated auditing/accounting services, varying quality of service levels providing privileged access to a set of users, node image management allowing the hosting center to restore an exact customer-specific image before enabling access. Resources available to a module 106, which may also be referred to as a provider resource broker, will have both rigid (architecture, RAM, local disk space, etc.) and flexible (OS, queues, installed applications etc.) attributes. The provider or on-demand resource broker 106 can typically provision (dynamically modify) flexible attributes but not rigid attributes. The provider broker 106 may possess multiple resources each with different types with rigid attributes (i.e., single processor and dual processor nodes, Intel nodes, AMD nodes, nodes with 512 MB RAM, nodes with 1 GB RAM, etc).

This combination of attributes presents unique constraints on a management system. We describe herein how the management modules 108 and 106 are able to effectively manage, modify and provision resources in this environment and provide full array of services on top of these resources.

Utility-based computing technology allows a hosting center 102 to quickly harness existing compute resources, dynamically co-allocate the resources, and automatically provision them into a seamless virtual cluster. The management modules' advanced reservation and policy management tools provide support for the establishment of extensive service level agreements, automated billing, and instant chart and report creation.

Also shown in FIG. 1 are several other components such as an identity manager 112 and a node provisioner 118 as part of the hosting center 102. The hosting master' 128 may include an identity manager interface 112 that may coordinate global and local information regarding users, groups, accounts, and classes associated with compute resources. The identity manager interface 112 may also allow the management module 106 to automatically and dynamically create and modify user accounts and credential attributes according to current workload needs. The hosting master 128 allows sites extensive flexibility when it comes to defining credential access, attributes, and relationships. In most cases, use of the USERCFG, GROUPCFG, ACCOUNTCFG, CLASSCFG, and QOSCFG parameters is adequate to specify the needed configuration. However, in certain cases, such as the following, this approach may not be ideal or even adequate: environments with very large user sets; environments with very dynamic credential configurations in terms of fairshare targets, priorities, service access constraints, and credential relationships; grid environments with external credential mapping information services; enterprise environments with fairness policies based on multi-cluster usage.

The modules address these and similar issues through the use of the identity manager 112. The identity manager 112 allows the module to exchange information with an external identity management service. As with the module's resource manager interfaces, this service can be a full commercial package designed for this purpose, or something far simpler by which the module obtains the needed information for a web service, text file, or database.

Next attention is turned to the node provisioner 118 and as an example of its operation, the node provisioner 118 can enable the allocation of resources in the hosting center 102 for workload from a local compute environment 104. The customer management module 108 will communicate with the hosting management module 106 to begin the provisioning process. In one aspect, the provisioning module 118 may generate another instance of necessary management software 120 and 122 which will be created in the hosting center environment as well as compute nodes 124 and 126 to be consumed by a submitted job. The new management module 120 is created on the fly, may be associated with a specific request and will preferably be operative on a dedicated node. If the new management module 120 is associated with a specific request or job, as the job consumes the resources associated with the provisioned compute nodes 124, 126, and the job becomes complete, then the system would remove the management module 120 since it was only created for the specific request. The new management module 120 may connect to other modules such as module 108. The module 120 does not necessarily have to be created but may be generated on the fly as necessary to assist in communication and provisioning and use of the resources in the utility environment 102. For example, the module 106 may go ahead and allocate nodes within the utility computing environment 102 and connect these nodes directly to module 108 but in that case you may lose some batch ability as a tradeoff. The hosting master 128 having the management module 106, identity manager 112 and node provisioner 118 preferably is co-located with the utility computing environment but may be distributed. The management module on the local environment 108 may then communicate directly with the created management module 120 in the hosting center to manage the transfer of workload and consumption of on-demand center resources.

FIG. 6 provides an illustration of a method aspect of utilizing the new management module. As shown, this method includes receiving an instruction at a slave management module associated with an on-demand computing environment from a master management module associated with a local computing environment (602) and based on the instruction, creating a new management module on a node in the on-demand computing environment and provisioning at least one compute node in the on-demand computing environment, wherein the new management module manages the at least one compute node and communicates with the master management module (604).

There are two supported primary usage models, a manual and an automatic model. In manual mode, utilizing the hosted resources can be as easy as going to a web site, specifying what is needed, selecting one of the available options, and logging in when the virtual cluster is activated. In automatic mode, it is even simpler. To utilize hosted resources, the user simply submits jobs to the local cluster. When the local cluster can no longer provide an adequate level of service, it automatically contacts the utility hosting center, allocates additional nodes, and runs the jobs. The end user is never aware that the hosting center even exists. He merely notices that the cluster is now bigger and that his jobs are being run more quickly.

When a request for additional resources is made from the local environment, either automatically or manually, a client module or client resource broker (which may be, for example, an instance of a management module 108 or 120) will contact the provider resource broker 106 to request resources. It will send information regarding rigid attributes of needed resources as well as quantity or resources needed, request duration, and request timeframe (i.e., start time, feasible times of day, etc.) It will also send flexible attributes which must be provisioned on the nodes 124, 126. Both flexible and rigid resource attributes can come from explicit workload-specified requirement or from implicit requirements associated with the local or default compute resources. The provider resource broker 106 must indicate if it is possible to locate requested resources within the specified timeframe for sufficient duration and of the sufficient quantity. This task includes matching rigid resource attributes and identifying one or more provisioning steps required to put in place all flexible attributes.

When provider resources are identified and selected, the client resource broker 108 or 120 is responsible for seamlessly integrating these resources in with other local resources. This includes reporting resource quantity, state, configuration and load. This further includes automatically enabling a trusted connection to the allocated resources which can perform last mile customization, data staging, and job staging. Commands are provided to create this connection to the provider resource broker 106, query available resources, allocate new resources, expand existing allocations, reduce existing allocations, and release all allocated resources.

In most cases, the end goal of a hosting center 102 is to make available to a customer, a complete, secure, packaged environment which allows them to accomplish one or more specific tasks. This packaged environment may be called a virtual cluster and may consist of the compute, network, data, software, and other resources required by the customer. For successful operation, these resources must be brought together and provisioned or configured so as to provide a seamless environment which allows the customers to quickly and easily accomplish their desired tasks.

Another aspect of the disclosure is the cluster interface. The desired operational model for many environments is providing the customer with a fully automated self-service web interface. Once a customer has registered with the host company, access to a hosting center portal is enabled. Through this interface, customers describe their workload requirements, time constraints, and other key pieces of information. The interface communicates with the backend services to determine when, where, and how the needed virtual cluster can be created and reports back a number of options to the user. The user selects the desired option and can monitor the status of that virtual cluster via web and email updates. When the virtual cluster is ready, web and email notification is provided including access information. The customer logs in and begins working.

The hosting center 102 will have related policies and service level agreements. Enabling access in a first come-first served model provides real benefits but in many cases, customers require reliable resource access with guaranteed responsiveness. These requirements may be any performance, resource or time based rule such as in the following examples: I need my virtual cluster within 24 hours of asking; I want a virtual cluster available from 2 to 4 PM every Monday, Wednesday, and Friday; I want to always have a virtual cluster available and automatically grow/shrink it based on current load, etc.

Quality of service or service level agreement policies allow customers to convert the virtual cluster resources to a strategic part of their business operations greatly increasing the value of these resources. Behind the scenes, a hosting center 102 consists of resource managers, reservations, triggers, and policies. Once configured, administration of such a system involves addressing reported resource failures (i.e., disk failures, network outages, etc) and monitoring delivered performance to determine if customer satisfaction requires tuning policies or adding resources.

The modules associated with the local environment 104 and the hosting center environment 102 may be referred to as a master module 108 and a slave module 106. This terminology relates to the functionality wherein the hosting center 102 receives requests for workload and provisioning of resources from the module 108 and essentially follows those requests. In this regard, the module 108 may be referred to as a client resource broker 108 which will contact a provider resource broker 106 (such as an On-Demand version of Moab).

The management module 108 may also be, by way of example, a Moab Workload Manager® operating in a master mode. The management module 108 communicates with the compute environment to identify resources, reserve resources for consumption by jobs, provision resources and in general manage the utilization of all compute resources within a compute environment. As can be appreciated by one of skill in the art, these modules may be programmed in any programming language, such as C or C++ and which language is immaterial to the disclosure.

In a typical operation, a user or a group submits a job to a local compute environment 104 via an interface to the management module 108. An example of a job is a submission of a computer program that will perform a weather analysis for a television station that requires the consumption of a large amount of compute resources. The module 108 and/or an optional scheduler 128 such as TORQUE, as those of skill in the art understand, manages the reservation of resources and the consumption of resources within the environment 104 in an efficient manner that complies with policies and restrictions. The use of a resource manager like TORQUE 128 is optional and not specifically required as part of the disclosure.

A user or a group of users will typically enter into a service level agreement (SLA) which will define the policies and guarantees for resources on the local environment 104. For example, the SLA may provide that the user is guaranteed 10 processors and 50 GB of hard drive space within 5 hours of a submission of a job request. Associated with any user may be many parameters related to permissions, guarantees, priority level, time frames, expansion factors, and so forth. The expansion factor is a measure of how long the job is taking to run on a local environment while sharing the environment with other jobs versus how long it would take if the cluster was dedicated to the job only. It therefore relates to the impact of other jobs on the performance of the particular job. Once a job is submitted and will sit in a job queue waiting to be inserted into the cluster 104 to consume those resources. The management software will continuously analyze the environment 104 and make reservations of resources to seek to optimize the consumption of resources within the environment 104. The optimization process must take into account all the SLA's of users, other policies of the environment 104 and other factors.

As introduced above, this disclosure provides improvements in the connectvity between a local environment 104 and an on-demand center 102. The challenges that exist in accomplishing such a connection include managing all of the capabilities of the various environments, their various policies, current workload, workload queued up in the job queues and so forth.

As a general statement, disclosed herein is a method and system for customizing an on-demand compute environment based on both implicit and explicit job or request requirements. For example, explicit requirements may be requirements specified with a job such as a specific number of nodes or processor and a specific amount of memory. Many other attributes or requirements may be explicitly set forth with a job submission such as requirements set forth in an SLA for that user. Implicit requirements may relate to attributes of the compute environment that the job is expecting because of where it is submitted. For example, the local compute environment 104 may have particular attributes, such as, for example, a certain bandwidth for transmission, memory, software licenses, processors and processor speeds, hard drive memory space, and so forth. Any parameter that may be an attribute of the local environment in which the job is submitted may relate to an implicit requirement. As a local environment 104 communicates with an on-demand environment 102 for the transfer of workload, the implicit and explicit requirements are seamlessly imported into the on-demand environment 102 such that the user's job can efficiently consume resources in the on-demand environment 102 because of the customization of that environment for the job. This seamless communication occurs between a master module 108 and a slave module 106 in the respective environments. As shown in FIG. 1, a new management module 120 may also be created for a specific process or job and also communicate with a master module 108 to manage the provisioning, consumption and clean up of compute nodes 124, 126 in the on-demand environment 102.

Part of the seamless communication process includes the analysis and provisioning of resources taking into account the need to identify resources such as hard drive space and bandwidth capabilities to actually perform the transfer of the workload. For example, if it is determined that a job in the queue has a SLA that guarantees resources within 5 hours of the request, and based on the analysis by the management module of the local environment the resources cannot be available for 8 hours, and if such a scenario is at triggering event, then the automatic and seamless connectivity with the on-demand center 102 will include an analysis of how long it will take to provision an environment in the on-demand center that matches or is appropriate for the job to run. That process, of provisioning the environment in the on-demand center 102, and transferring workload from the local environment 104 to the on-demand center 102, may take, for example, 1 hour. In that case, the on-demand center will begin the provisioning process one hour before the 5 hour required time such that the provisioning of the environment and transfer of data can occur to meet the SLA for that user. This provisioning process may involve reserving resources within the on-demand center 102 from the master module 108 as will be discussed more below.

FIG. 3 illustrates an embodiment in this regard, wherein a method includes detecting an event in a local compute environment (302). The event may be a resource need event such as a current resource need or a predicted resource need. Based on the detected event, a module automatically establishes communication with an on-demand compute environment (304). This may also involve dynamically negotiating and establishing a grid/peer relationship based on the resource need event. A module provisions resources within the on-demand compute environment (306) and workload is transferred from the local-environment transparently to the on-demand compute environment (308). Preferably, local information is imported to the on-demand environment and on-demand information is communicated to the local compute environment, although only local environment information may be needed to be transmitted to the on-demand environment. Typically, at least local environment information is communicated and also job information may be communicated to the on-demand environment. Examples of local environment information may be at least one of class information, configuration policy information and other information. Information from the on-demand center may relate to at least one of resources, availability of resources, time frames associated with resources and any other kind of data that informs the local environment of the opportunity and availability of the on-demand resources. The communication and management of the data between the master module or client module in the local environment and the slave module is preferably transparent and unknown to the user who submitted the workload to the local environment. However, one aspect may provide for notice to the user of the tapping into the on-demand resources and the progress and availability of those resources.

Example triggering events may be related to at least one of a resource threshold, a service threshold, workload and a policy threshold or other factors. Furthermore, the event may be based one of all workload associated with the local compute environment or a subset of workload associated with the compute environment or any other subset of a given parameter or may be external to the compute environment such as a natural disaster or power outage or predicted event.

The disclosure below provides for various aspects of this connectivity process between a local environment 104 and an on-demand center 102. The CD submitted with the priority Provisional Patent Application includes source code that carries out this functionality. The various aspects will include an automatic triggering approach to transfer workload from the local environment 104 to the on-demand center 102, a manual "one-click" method of integrating the on-demand compute environment 102 with the local environment 104 and a concept related to reserving resources in the on-demand compute environment 102 from the local compute environment 104.

The first aspect relates to enabling the automatic detection of a triggering event such as passing a resource threshold or service threshold within the compute environment 104. This process may be dynamic and involve identifying resources in a hosting center, allocating resources and releasing them after consumption. These processes may be automated based on a number of factors, such as: workload and credential performance thresholds; a job's current time waiting in the queue for execution, (queuetime) (i.e., allocate if a job has waited more than 20 minutes to receive resources); a job's current expansion factor which relates to a comparison of the affect of other jobs consuming local resources has on the particular job in comparison to a value if the job was the only job consuming resources in the local environment; a job's current execution load (i.e., allocate if load on job's allocated resources exceeds 0.9); quantity of backlog workload (i.e., allocate if more than 50,000 proc-hours of workload exist); a job's average response time in handling transactions (i.e., allocate if job reports it is taking more than 0.5 seconds to process transaction); a number of failures workload has experienced (i.e., allocate if a job cannot start after 10 attempts); overall system utilization (i.e., allocate if more than 80% of machine is utilized) and so forth. This is an example list and those of skill in the art will recognize other factors that may be identified as triggering events.

Other triggering events or thresholds may include a predicted workload performance threshold. This would relate to the same listing of events above but be applied in the context of predictions made by a management module or customer resource broker.

Another listing of example events that may trigger communication with the hosting center include, but are not limited to events such as resource failures including compute nodes, network, storage, license (i.e., including expired licenses); service failures including DNS, information services, web services, database services, security services; external event detected (i.e., power outage or national emergency reported) and so forth. These triggering events or thresholds may be applied to allocate initial resources, expand allocated resources, reduce allocated resources and release all allocated resources. Thus, while the primary discussion herein relates to an initial allocation of resources, these triggering events may cause any number of resource-related actions. Events and thresholds may also be associated with any subset of jobs or nodes (i.e., allocate only if threshold backlog is exceeded on high priority jobs only or jobs from a certain user or project or allocate resources only if certain service nodes fail or certain licenses become unavailable.)

For example, if a threshold of 95% of processor consumption is met by 951 processors out of the 1000 processors in the environment are being utilized, then the system (which may or may not include the management module 108) automatically establishes a connection with the on-demand environment 102. Another type of threshold may also trigger the automatic connection such as a service level received threshold, a service level predicted threshold, a policy-based threshold, a threshold or event associated with environment changes such as a resource failure (compute node, network storage device, or service failures).

In a service level threshold, one example is where a SLA specifies a certain service level requirement for a customer, such as resources available within 5 hours. If an actual threshold is not met, i.e., a job has waited now for 5 hours without being able to consume resource, or where a threshold is predicted to not be met, these can be triggering events for communication with the on-demand center. The module 108 then communicates with the slave manager 106 to provision or customize the on-demand resources 102. The two environments exchange the necessary information to create reservations of resources, provision, handle licensing, and so forth, necessary to enable the automatic transfer of jobs or other workload from the local environment 104 to the on-demand environment 102. For a particular task or job, all or part of the workload may be transferred to the on-demand center. Nothing about a user job 110 submitted to a management module 108 changes. The on-demand environment 102 then instantly begins running the job without any change in the job or perhaps even any knowledge of the submitter.

There are several aspects of the disclosure that are shown in the source code on the CD. One is the ability to exchange information. For example, for the automatic transfer of workload to the on-demand center, the system will import remote classes, configuration policy information and other information from the local scheduler 108 to the slave scheduler 106 for use by the on-demand environment 102. Information regarding the on-demand compute environment, resources, policies and so forth are also communicated from the slave module 106 to the local module 108.

The triggering event for the automatic establishment of communication with the on-demand center and a transfer of workload to the on-demand center may be a threshold that has been passed or an event that occurred. Threshold values may include an achieved service level, predicted service level and so forth. For example, a job sitting in a queue for a certain amount of time may trigger a process to contact the on-demand center and transfer that job to the on-demand center to run. If a queue has a certain number of jobs that have not been submitted to the compute environment for processing, if a job has an expansion factor that has a certain value, if a job has failed to start on a local cluster one or more times for whatever reason, then these types of events may trigger communication with the on-demand center. These have been examples of threshold values that when passed will trigger communication with the on-demand environment.

Example events that also may trigger the communication with the on-demand environment include, but are not limited to, events such as the failure of nodes within the environment, storage failure, service failure, license expiration, management software failure, resource manager fails, etc. In other words, any event that may be related to any resource or the management of any resource in the compute environment may be a qualifying event that may trigger workload transfer to an on-demand center. In the license expiration context, if the license in a local environment of a certain software package is going to expire such that a job cannot properly consume resources and utilize the software package, the master module 108 can communicate with the slave module 106 to determine if the on-demand center has the requisite license for that software. If so, then the provisioning of the resources in the on-demand center can be negotiated and the workload transferred wherein it can consume resources under an appropriate legal and licensed framework.

The basis for the threshold or the event that triggers the communication, provisioning and transfer of workload to the on-demand center may be all jobs/workload associated with the local compute environment or a subset of jobs/workload associated with the local compute environment. In other words, the analysis of when an event and/or threshold should trigger the transfer of workload may be based on a subset of jobs. For example, the analysis may be based on all jobs submitted from a particular person or group or may be based on a certain type of job, such as the subset of jobs that will require more than 5 hours of processing time to run. Any parameter may be defined for the subset of jobs used to base the triggering event.

The interaction and communication between the local compute environment and the on-demand compute environment enables an improved process for dynamically growing and shirking provisioned resource space based on load. This load balancing between the on-demand center and the local environment may be based on thresholds, events, all workload associated with the local environment or a subset of the local environment workload.

Another aspect of the disclosure is the ability to automate data management between two sites. This involves the transparent handling of data management between the on-demand environment 102 and the local environment 104 that is transparent to the user. Typically environmental information will always be communicated between the local environment 104 and the on-demand environment 102. In some cases, job information may not need to be communicated because a job may be gathering its own information, say from the Internet, or for other reasons. Therefore, in preparing to provision resources in the on-demand environment all information or a subset of information is communicated to enable the process. Yet another aspect of the disclosure relates to a simple and easy mechanism to enable on-demand center integration. This aspect of the disclosure involves the ability of the user or an administrator to, in a single action like the click of a button or a one-click action, be able to command the integration of an on-demand center information and capability into the local resource manager 108.

Figure 4:
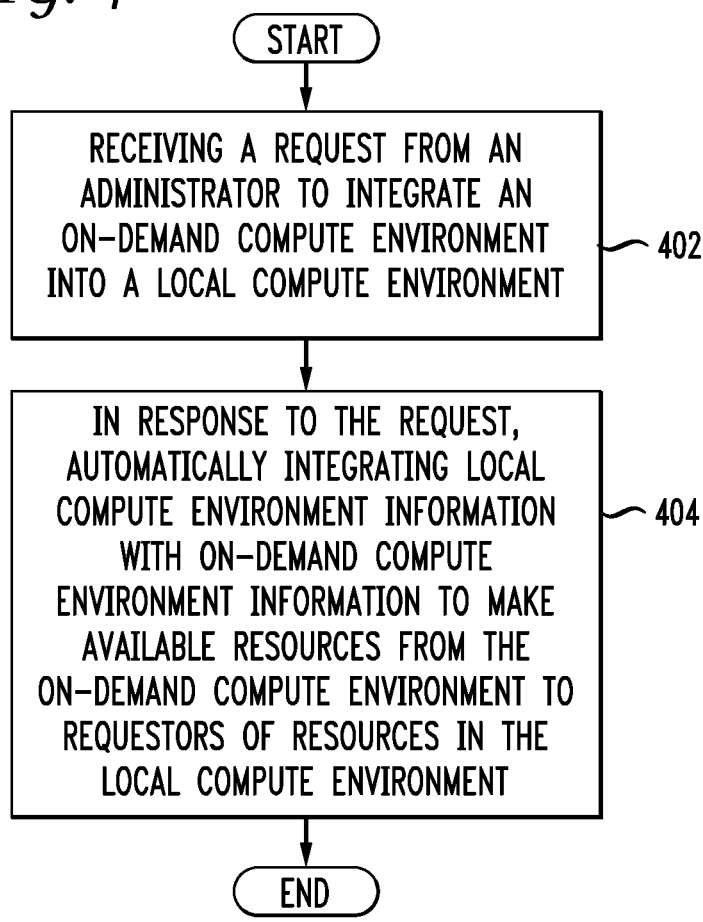
FIG. 4 illustrates a method aspect of the disclosure.

This feature is illustrated in FIG. 4. A module, preferably associated with the local compute environment, receives a request from an administrator to integrate an on-demand compute environment into the local compute environment (402). The creation of a reservation or of a provisioning of resources in the on-demand environment may be from a request from an administrator or local or remote automated broker. In this regard, the various modules will automatically integrate local compute environment information with on-demand compute environment information to make available resources from the on-demand compute environment to requestors of resources in the local compute environment (404). Integration of the on-demand compute environment may provide for integrating: resource configuration, state information, resource utilization reporting, job submission information, job management information resource management, policy controls including priority, resource ownership, queue configuration, job accounting and tracking and resource accounting and tracking. Thus, the detailed analysis and tracking of jobs and resources may be communicated back from the on-demand center to the local compute environment interface. Furthermore, this integration process may also include a step of automatically creating at least one of a data migration interface and a job migration interface.

Another aspect provides for a method of integrating an on-demand compute environment into a local compute environment. The method includes receiving a request from an administrator or via an automated command from an event trigger or administrator action to integrate an on-demand compute environment into a local compute environment. In response to the request, local workload information and/or resource configuration information is routed to an on-demand center and an environment is created and customized in the on-demand center that is compatible with workload requirements submitted to the local compute environment. Billing and costing are also automatically integrated and handled.

The exchange and integration of all the necessary information and resource knowledge may be performed in a single action or click to broaden the set of resources that may be available to users who have access initially only to the local compute environment 104. The system may receive the request to integrate an on-demand compute environment into a local compute environment in other manners as well, such as any type of multi-modal request, voice request, graffiti on a touch-sensitive screen request, motion detection, and so forth. Thus the one-click action may be a single tap on a touch sensitive display or a single voice command such as "integrate" or another command or multi-modal input that is simple and singular in nature. In response to the request, the system automatically integrates the local compute environment information with the on-demand compute environment information to enable resources from the on-demand compute environment available to requestors of resources in the local compute environment.

The one-click approach relates to the automated approach expect a human is in the middle of the process. For example, if a threshold or a triggering event is passed, an email or a notice may be sent to an administrator with options to allocate resources from the on-demand center. The administrator may be presented with one or more options related to different types of allocations that are available in the on-demand center- and via one-click or one action the administrator may select the appropriate action. For example, three options may include 500 processors in 1 hour; 700 processors in 2 hours; and 1000 processors in 10 hours. The options may be intelligent in that they may take into account the particular triggering event, costs of utilizing the on-demand environment, SLAs, policies, and any other parameters to present options that comply with policies and available resources. The administrator may be given a recommended selection based on SLAs, cost, or any other parameters discussed herein but may then choose the particular allocation package for the on-demand center. The administrator also may have an option, without an alert, to view possible allocation packages in the on-demand center if the administrator knows of an upcoming event that is not capable of being detected by the modules, such as a meeting with a group wherein they decide to submit a large job the next day which will clearly require on-demand resources. The one-click approach encapsulates the command line instruction to proceed with the allocation of on-demand resources.

One of the aspects of the disclosure is the integration of an on-demand environment 102 and a local compute environment 104 is that the overall data appears locally. In other words, the local scheduler 108 will have access to the resources and knowledge of the on-demand environment 102 but those resources, with the appropriate adherence to local policy requirements, is handled locally and appears locally to users and administrators of the local environment 104.

Another aspect of the disclosure that is enabled with the attached source code is the ability to specify configuration information and feeding it down the line. For example, the interaction between the compute environments supports static reservations. A static reservation is a reservation that a user or an administrator cannot change, remove or destroy. It is a reservation that is associated with the resource manager 108 itself. A static reservation blocks out time frames when resources are not available for other uses. For example, if to enable a compute environment to have workload run on (or consume) resources, a job takes an hour to provision a resources, then the module 108 may make a static reservation of resources for the provisioning process. The module 108 will locally create a static reservation for the provisioning component of running the job. The module 108 will report on these constraints associated with the created static reservation within the on-demand compute environment.

Then, the module 108 will communicate with the slave module106 if on-demand resources are needed to run a job. The module 108 communicates with the slave module 106 and identifies what resources are needed (20 processors and 512 MB of memory, for example) and inquires when can those resources be available. Assume that module 106 responds that the processors and memory will be available in one hour and that the module108 can have those resources for 36 hours. Once all the appropriate information has been communicated between the modules 106 and 108, then module108 creates a static reservation to block the first part of the resources which requires the one hour of provisioning. The module 108 may also block out the resources with a static reservation from hour 36 to infinity until the resources go away. Therefore, from zero to one hour is blocked out by a static reservation and from the end of the 36 hours to infinity is blocked out. In this way, the scheduler 108 can optimize the on-demand resources and insure that they are available for local workloads. The communication between the modules 106 and 108 is performed preferably via tunneling.

Another aspect relates to receiving requests or information associated with resources in an on-demand center. An example will illustrate. Assume that a company has a reservation of resources within an on-demand center but then finds out that their budget is cut for the year. There is a mechanism for an administrator to enter information such as a request for a cancellation of a reservation so that they do not have to pay for the consumption of those resources. Any type of modification of the on-demand resources may be contemplated here. This process involves translating a current or future state of the environment for a requirement of the modification of usable resources. Another example includes where a group determines that they will run a large job over the weekend that will knowingly need more than the local environment. An administrator can submit in the local resource broker 108 a submission of information associated with a parameter—such as a request for resources and the local broker 108 will communicate with the hosting center 106 and the necessary resources can be reserved in the on-demand center even before the job is submitted to the local environment.

The modification of resources within the on-demand center may be an increase, decrease, or cancellation of resources or reservations for resources. The parameters may be a direct request for resources or a modification of resources or may be a change in an SLA which then may trigger other modifications. For example, if an SLA prevented a user from obtaining more than 500 nodes in an on-demand center and a current reservation has maximized this request, a change in the SLA agreement that extended this parameter may automatically cause the module 106 to increase the reservation of nodes according to the modified SLA. Changing policies in this manner may or may not affect the resources in the on-demand center.

Figure 5:
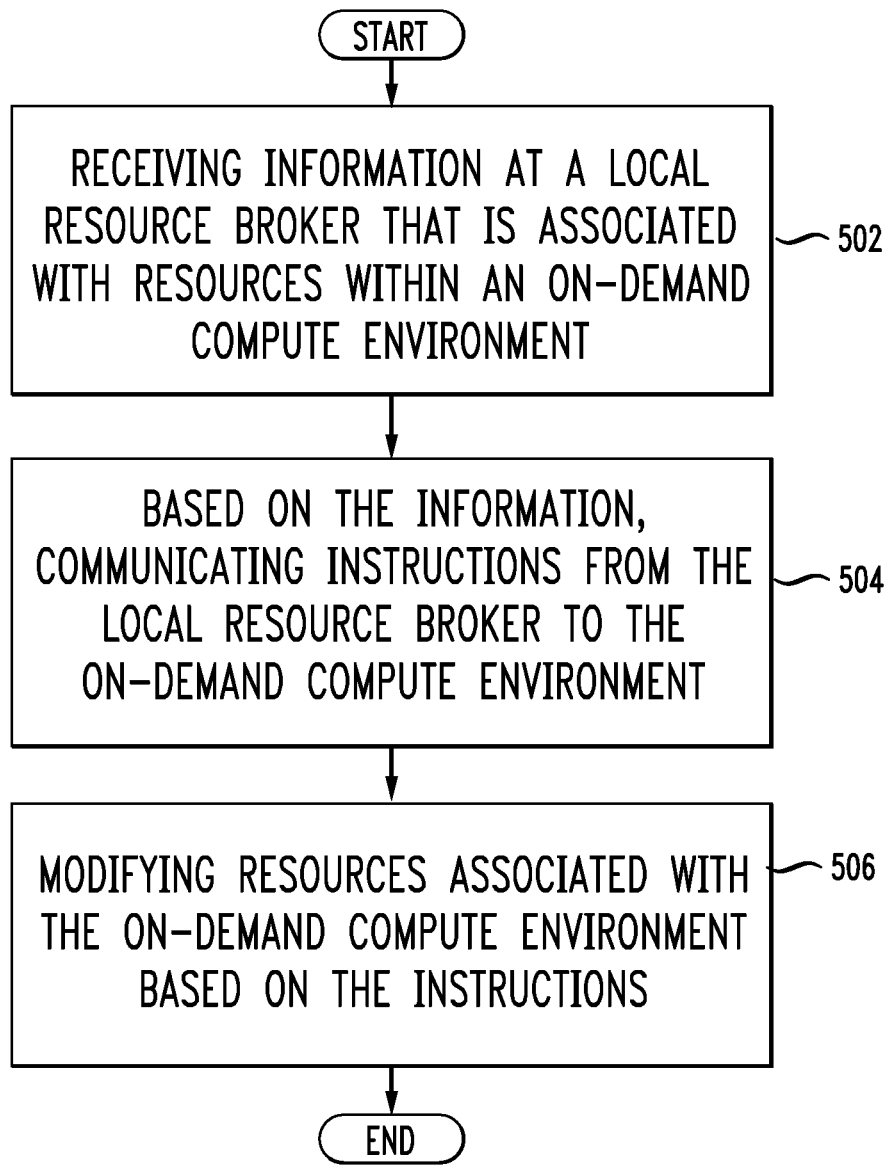
FIG. 5 illustrates another method aspect of the disclosure.

FIG. 5 illustrates a method embodiment related to modifying resources in the on-demand compute environment. The method includes receiving information at a local resource broker that is associated with resources within an on-demand compute environment (502).

Based on the information, the method includes communicating instructions from the local resource broker to the on-demand compute environment (504) and modifying resources associated with the on-demand compute environment based on the instructions (506). As mentioned above, examples of the type of information that may be received include information associated with a request for a new reservation, a cancellation of an existing reservation, or a modification of a reservation such as expanding or contracting the reserved resources in the on-demand compute environment. Other examples include a revised policy or revision to an SLA that alters (increases or perhaps decreases) allowed resources that may be reserved in the on-demand center. The master module 108 will then provide instructions to the slave module 106 to create or modify reservations in the on-demand computing environment or to make some other alteration to the resources as instructed.

Receiving resource requirement information may be based on user specification, current or predicted workload. The specification of resources may be fully explicit, or may be partially or fully implicit based on workload or based on virtual private cluster (VPC) package concept where VPC package can include aspects of allocated or provisioning support environment and adjustments to resource request timeframes including pre-allocation, allocation duration, and post-allocation timeframe adjustments. Virtual private clusters are incorporated herein by the application referenced above and are applicable and utilized in an aspect of the disclosure. The reserved resources may be associated with provisioning or customizing the delivered compute environment. A reservation may involve the co-allocation of resources including any combination of compute, network, storage, license, or service resources (i.e., parallel database services, security services, provisioning services) as part of a reservation across multiple different resource types. Also, the co-allocation of resources over disjoint timeframes to improve availability and utilization of resources may be part of a reservation or a modification of resources. Resources may also be reserved with automated failure handling and resource recovery.

Another feature associated with reservations of resources within the on-demand environment is the use of provisioning padding. This is an alternate approach to the static reservation discussed above. For example, if a reservation of resources would require 2 hours of processing time for 5 nodes, then that reservation may be created in the on-demand center as directed by the client resource broker 108. As part of that same reservation or as part of a separate process, the reservation may be modified or adjusted to increase its duration to accommodate for provisioning overhead and clean up processes. Therefore, there may need to be ½ hour of time in advance of the beginning of the two hour block wherein data transmission, operating system set up, or any other provisioning step needs to occur. Similarly, at the end of the two hours, there may need to be 15 minutes to clean up the nodes and transmit processed data to storage or back to the local compute environment. Thus, an adjustment of the reservation may occur to account for this provisioning in the on-demand environment. This may or may not occur automatically, for example, the user may request resources for 2 hours and the system may automatically analyze the job submitted or utilize other information to automatically adjust the reservation for the provisioning needs. The administrator may also understand the provisioning needs and specifically request a reservation with provisioning pads on one or both ends of the reservation.

A job may also be broken into component parts and only one aspect of the job transferred to an on-demand center for processing. In that case, the modules will work together to enable co-allocation of resources across local resources and on-demand resources. For example, memory and processors may be allocated in the local environment while disk space is allocated in the on-demand center. In this regard, the local management module could request the particular resources needed for the co-allocation from the on-demand center and when the job is submitted for processing that portion of the job would consume on-demand center resources while the remaining portion of the job consumes local resources. This also may be a manual or automated process to handle the co-allocation of resources.

Another aspect relates to interaction between the master management module 106 and the slave management module 106. Assume a scenario where the local compute environment requests immediate resources from the on-demand center. Via the communication between the local and the on-demand environments, the on-demand environment notifies the local environment that resources are not available for eight hours but provides the information about those resources in the eight hours. At the local environment, the management module 108 may instruct the on-demand management module 106 to establish a reservation for those resources as soon as possible (in eight hours) including, perhaps, provisioning padding for overhead. Thus, although the local environment requested immediate resources from the on-demand center, the best that could be done in this case is a reservation of resources in eight hours given the provisioning needs and other workload and jobs running on the on-demand center. Thus, jobs running or in the queue at the local environment will have an opportunity to tap into the reservation and given a variety of parameters, say job number 12 has priority or an opportunity to get a first choice of those reserved resources.

With reference to FIG. 2, an exemplary system for implementing the disclosure includes a general purpose computing device 200, including a processing unit (CPU) 220, a system memory 230, and a system bus 210 that couples various system components including the system memory 230 to the processing unit 220. The system bus 210 may be any of several types of bus structures including a memory bus or memory controller, a peripheral bus, and a local bus using any of a variety of bus architectures. The system may also include other memory such as read only memory (ROM) 240 and random access memory (RAM) 250. A basic input/output (BIOS), containing the basic routine that helps to transfer information between elements within the computing device 200, such as during start-up, is typically stored in ROM 240. The computing device 200 further includes storage means such as a hard disk drive 260, a magnetic disk drive, an optical disk drive, tape drive or the like. The storage device 260 is connected to the system bus 210 by a drive interface. The drives and the associated computer-readable media provide nonvolatile storage of computer readable instructions, data structures, program modules and other data for the computing device 200. In this regard, the various functions associated with the disclosure that are primarily set forth as the method embodiment of the disclosure may be practiced by using any programming language and programming modules to perform the associated operation within the system or the compute environment. Here the compute environment may be a cluster, grid, or any other type of coordinated commodity resources and may also refer to two separate compute environments that are coordinating workload, workflow and so forth such as a local compute environment and an on-demand compute environment. Any such programming module will preferably be associated with a resource management or workload manager or other compute environment management software such as Moab but may also be separately programmed. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that is accessible by a computer, such as magnetic cassettes, flash memory cards, digital video disks, memory cartridges, random access memories (RAMs) read only memory (ROM), and the like, may also be used in the exemplary operating environment. The system above provides an example server or computing device that may be utilized and networked with a cluster, clusters or a grid to manage the resources according to the principles set forth herein. It is also recognized that other hardware configurations may be developed in the future upon which the method may be operable.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. As can also be appreciated, the compute environment itself, being managed according to the principles of the disclosure, may be an embodiment of the disclosure. Thus, separate embodiments may include an on-demand compute environment, a local compute environment, both of these environments together as a more general compute environment, and so forth. In a distributed computing environment, program modules may be located in both local and remote memory storage devices. Accordingly, the scope of the claims should be governed by the claims and their equivalents below rather than by any particular example in the specification.

I claim:

1. A method comprising:
receiving a request to integrate a remote compute environment into a local compute environment, wherein a specification of compute resources associated with the request is one of fully explicit, partially explicit, fully implicit based on workload, and based on a virtual private cluster package concept where a virtual private cluster package can include aspects of provisioning a support environment and adjustments to resource request timeframes including pre-allocation, allocation duration, and post-allocation timeframe adjustments, wherein the remote compute environment comprises a plurality of networked compute nodes under common management and the local compute environment comprises a plurality of networked compute nodes under common management that is separate from the common management of the remote compute environment, wherein the remote compute environment and the local compute environment are configured to receive and process user-submitted workload, and wherein the compute resources comprise at least one of a server, memory, network bandwidth, a processor, and a virtual compute resource;
in response to the request, automatically integrating local compute environment information with remote compute environment information to make available resources from the remote compute environment to requestors of resources in the local compute environment under the local compute environment requirements; and
receiving a transfer of user-submitted workload at the remote compute environment from the local compute environment to yield transferred workload, such that policies, classes, qualities of service and resource limits associated with the local compute environment information are maintained for the transferred workload, wherein the user-submitted workload was submitted by a requestor to the local compute environment for processing.

2. The method of claim 1, wherein all data associated with the local compute environment and the remote compute environment is handled and appears locally.

3. The method of claim 1, wherein availability of the remote compute environment is transparent to requestors.

4. The method of claim 1, wherein the request is a one-click request for access to the remote compute environment.

5. The method of claim 1, wherein integrating the local compute environment information with the remote compute environment information causes the remote compute environment to consume workload based on policy requirements for jobs submitted to the local compute environment.

6. The method of claim 1, further comprising:
presenting an administrator with a plurality of options related to available modifications to resources within the remote compute environment.

7. The method of claim 6, wherein the request from the administrator is associated with a selection of one of the plurality of options.

8. The method of claim 1, further comprising:
prior to receiving the request, sending an event notice to an administrator; and
presenting, based on the event, the administrator at least one option related to resources with the remote compute environment, wherein the request that is received is based on a selection from the at least one option.

9. The method of claim 1, wherein integrating the local compute environment information comprises integrating at least one of: resource configuration, state information, resource utilization reporting, job submission information, job management, information resource management, policy controls including priority, resource ownership, queue configuration, job accounting and tracking, and resource accounting and tracking.

10. The method of claim 1, wherein integrating the local compute environment information further comprises automatically creating at least one of a data migration interface and a job migration interface.

11. The method of claim 1, wherein the request is received from an administrator via a web interface.

12. A non-transitory computer readable storage medium storing instructions which, when executed by a processor, cause the processor to perform operations comprising:
receiving a request to integrate a remote compute environment into a local compute environment, wherein a specification of compute resources associated with the request is one of fully explicit, partially explicit, fully implicit based on workload, and based on a virtual private cluster package concept where the virtual private cluster package can include aspects of provisioning a support environment and adjustments to resource request timeframes including pre-allocation, allocation duration, and post-allocation timeframe adjustments, wherein the remote compute environment comprises a plurality of compute nodes under common management and the local compute environment comprises a plurality of networked compute nodes under common management that is separate from the common management of the remote compute environment, wherein the remote compute environment and the local compute environment are configured to receive and process user-submitted workload, and wherein the compute resources comprise at least one of a server, memory, network bandwidth, a processor, and a virtual compute resource;
in response to the request, integrating local compute environment information with remote compute environment information to make available resources from the remote compute environment to requestors of resources in the local compute environment under requirements in the local compute environment information; and
receiving a transfer of the user-submitted workload at the remote compute environment that was submitted by a requestor to the local compute environment, to yield transferred workload, wherein policies, classes, qualities of service and resource limits associated with the local compute environment information are maintained for the transferred workload.

13. The non-transitory computer readable storage medium of claim 12, wherein all data associated with the local compute environment and the remote compute environment is handled and appears locally.

14. The non-transitory computer readable storage medium of claim 12, wherein the availability of the remote compute environment is transparent to requestors.

15. The non-transitory computer readable storage medium of claim 12, wherein integrating the local compute environment information further comprises integrating at least one of: resource configuration, state information, resource utilization reporting, job submission information, job management information, resource management, policy controls including priority, resource ownership, queue configuration, job accounting and tracking, and resource accounting and tracking.

* * * * *